United States Patent [19]
Kennedy

[11] Patent Number: 5,741,453
[45] Date of Patent: Apr. 21, 1998

[54] METHOD FOR MAKING A ROTATIONALLY MOLDED SPA

[75] Inventor: John C. Kennedy, Grand Rapids, Mich.

[73] Assignee: Emerald Spa Corporation, Kentwood, Mich.

[21] Appl. No.: 553,152

[22] Filed: Nov. 7, 1995

[51] Int. Cl.$^6$ ............................................. B29C 71/00
[52] U.S. Cl. ........................ 264/237; 264/310; 264/348
[58] Field of Search ................................. 264/310, 237, 264/348

[56] References Cited

U.S. PATENT DOCUMENTS

| | | |
|---|---|---|
| 3,914,361 | 10/1975 | Shiina et al. . |
| 4,651,538 | 3/1987 | Bull et al. . |
| 5,172,433 | 12/1992 | Lake . |
| 5,236,581 | 8/1993 | Perry . |
| 5,494,718 | 2/1996 | Adams et al. . |

*Primary Examiner*—Karen Aftergut

[57] ABSTRACT

A spa having a one-piece, rotationally molded shell defining a reservoir for containing water including at least three sidewalls connected by an interior footwell, at least three exterior sidewalls, a coping interconnecting the reservoir sidewalls and the exterior sidewalls, and a floor beneath the reservoir footwell and interconnecting the exterior sidewalls. Water is circulated within the reservoir by a plumbing system which is disposed within an interior space defined between the reservoir sidewalls, the exterior sidewalls, the coping, and the floor; the plumbing system including a plurality of jets extending through the reservoir sidewalls; a plumbing harness; and a pump for circulating the water from the reservoir into the jets. It is also contemplated that a filter system and heating element may be provided and enclosed within the interior space of the spa. The one-piece, unitary spa shell construction provides several advantages over the prior spas including a portable, lightweight construction; a strong, durable polymeric frame and tub structure, which is substantially puncture proof, resistant to abrasions and scratches, and is chemically and ultra-violetly stable such that the tub may be used either indoors or outdoors and maintain a nice appearance despite exposure to the elements. Additionally, the polymeric construction of the shell provides great flexibility in spa design and color combinations, suitable for substantially all tastes and desires. A method for manufacturing a one-piece rotationally molded spa is also provided generally including the steps of providing a mold with a cavity, introducing a powdered polymeric material into the mold cavity, molding the polymeric material into the shape of a spa, removing the spa from the mold and placing the molded spa in a cooling fixture to produce a memory in the polymeric material.

2 Claims, 3 Drawing Sheets

METHOD FOR MAKING A ROTATIONALLY MOLDED SPA

BACKGROUND OF THE INVENTION

This invention relates generally to hot tubs, whirlpool spas, jetted tubs, and the like and particularly to a tub or spa wherein the water containing reservoir is integrally molded with the exterior cabinet sidewalls and floor or base of the cabinet.

In the past, whirlpool spas and related structures were typically comprised of a sheet of fiber-reinforced acrylic or other plastic vacuum formed to produce a spa shell nested in a wood-framed cabinet. The shell was plumbed to circulate water retained therein through a pump, heater, and filter often housed beneath the spa shell and within the base cabinet. An advantage associated with such spas or tubs is that the molds for vacuum forming the shell are relatively easy to manufacture in substantially any shape. Furthermore, the materials for manufacturing the spa are readily accessible. However, a major disadvantage of such spas or tubs is that they are often extremely heavy and, as a result, are difficult to move. As a result, a location is often dedicated for the spa or tub. Additionally, the spa cabinet requires maintenance due to its constant exposure to warm and/or chemically treated water.

In an effort to promote portability, many spa and whirlpool tub manufacturers offered smaller, lightweight tubs. Some designs offered a foam-wrapped sidewall construction plumbed by cutting slots or channels in the walls and covering the foam walls with a vinyl liner and a decorative vinyl exterior material. Circulation of the water was provided by a separate package which housed a pump and a heating element, connected to the tub through two external pipe fittings. Because the tub was formed by wound layers of foam, the tub had a circular or round configuration and, because it was light weight, could be rolled to various locations when empty. Similar circular tub styles were produced wherein the tub walls were formed by expanded polyurethane foam and vacuum formed sheets of plastic, the latter needing a separately manufactured cabinet to support the shell. The expanded polyurethane foam spa was formed around and encapsulated the plumbing harness and used a foam sheet to provide a padded floor. The expanded foam design also required a vinyl liner and used a vinyl decorative exterior wall covering. Disadvantages of these prior portable spas included wall constructions which were unable to prevent bulging, wall constructions that once damaged or dented required expensive repairs, vinyl liners which were sensitive to pH levels in the water, and expensive and time-consuming manufacturing and repairing techniques. Furthermore, because of their portable nature, the tubs did not offer seating; a user typically sat on an inflatable pillow accessory or directly on the floor of the tub. Lastly, the materials used to cover the exterior of the spas often needed to be sewn, which were susceptible to tears and splits at the seams. No one has yet produced an inexpensive, low-maintenance portable spa which offers the structural strength, integrity, and unit package provided by wood cabinets wherein the pump, heater, and filter elements are integral with the spa; light enough when empty to be moved by two adults; and which can withstand the full effect of water, chemicals, and exposure to the sun and still remain functional and attractive with minimal maintenance.

SUMMARY OF THE INVENTION

According to one aspect of the invention, a spa, whirlpool tub, bathtub, or hot tub is provided which includes a reservoir, exterior sidewalls, a coping, and a floor wherein the above structures are molded as a single unit. Additional aspects of the invention include a cavity between the reservoir, sidewalls, and floor which includes a plumbing harness interconnecting the reservoir, at one or more locations, to a pump for circulating water within the reservoir. Also included are a filter and heater assembly within the cavity and interconnected to the pump by the plumbing harness. To provide the appropriate support and structural rigidity, the reservoir seating is supported above the floor by one or more stand-offs or bridges extending from the floor.

The advantages provided by this invention include a one-piece spa shell and cabinet design that provides a straightforward, inexpensive construction in portable spas. Moreover, the spa sidewalls and floor space are open or hollow, accessible from the exterior through openings in the sidewalls to allow service of the spa plumbing harness. The one-piece reservoir, sidewalls, and floor are also made from a strong, durable polymeric material which is substantially puncture proof, abrasion resistant, chemically and UV-stable, and lightweight so as to be easily moved. The material provides great flexibility in spa design and color combination and may be connected to conventional 110 volt electrical outlets.

BRIEF DESCRIPTION OF THE DRAWING FIGURES

A better understanding of the invention and the advantages provided thereby may be obtained by reference to the specification and the attached drawing figures, wherein.

DESCRIPTION OF THE PREFERRED EMBODIMENTS

Figure 1:
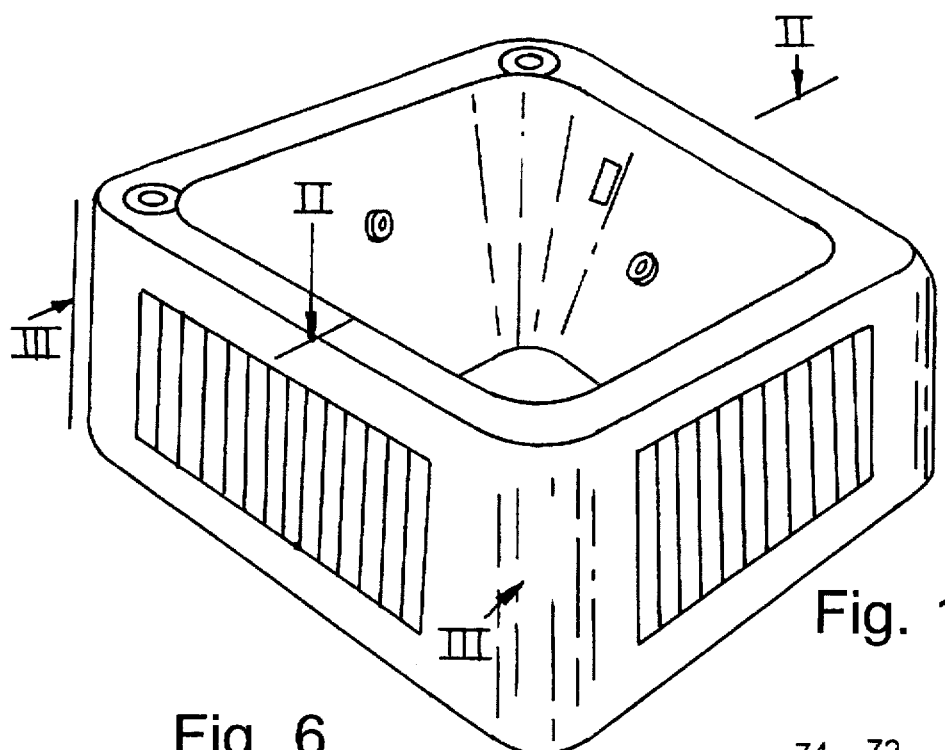
FIG. 1 is an oblique view of spa embodying the invention.

As used herein, the term "spa" shall include hot tubs, whirlpools tubs, therapeutic tubs, whirlpool spas, whirlpool bathtubs, jetted tubs, and the like having a reservoir with one or more jets for circulating water therein. Other terms not specifically identified herein may be used to refer to similar structures and functions and are contemplated to be considered within the scope of this invention.

Referring now to the drawing figures, spa 10 embodying the invention includes a reservoir 12 defined by at least one vertical sidewall 14, preferably three sidewalls 14, 16, and 18, and most preferably with a fourth sidewall 20, each sidewall terminating in a footwell 22 at the bottom of reservoir 12 and at a coping 24 defined at the upper portion of reservoir 12. Spaced from sidewalls 14–20 and depending from coping 24, are exterior sidewalls 26, 28, 30, and 32. Each exterior sidewall 26–32 terminates at its lower extreme in a floor or base 34 which is disposed beneath footwell 22. In a preferred embodiment, reservoir 12 defined reservoir sidewalls 14–20 and footwell 22, coping 24, exterior sidewalls 26–32, and floor 34 are preferably formed as a single, integral unit from a continuous molding process, and most preferably a rotational molding from a polymeric material such as polyethylene. Elements 12–34 described above are continuous and do not have any seams or joints where the polymeric material has been welded together, but contains substantially smooth and continuous transitions from structure to structure. In a preferred embodiment, sidewalls 14–20 define at least one seat or bench 36, and preferably two benches or seat structures 36, 38, each of different heights. Each seat or bench 36, 38 is preferably spaced above floor 34 by a predetermined distance, yet at a sufficient distance from coping 24 such that when the user is in a seated position, a substantial portion of the user's body may be submerged in the water. In the preferred embodiment, the two different bench heights permits users of different statures to assume a comfortable position with respect to the water level in reservoir 12. As is conventional in spas, disposed at predetermined locations along reservoir sidewalls 14–20 may be one or more spa jets 40 located appropriately to achieve the desired circulation and therapeutic benefits. Also disposed within footwell 22 or a lower portion of one of reservoir sidewalls 14–20, may be a drain or suction inlet 42 where water is removed from reservoir 12. Drain 42 may, in turn, be interconnected to reservoir 12 through a plumbing system described below and jets 40. Additionally, reservoir sidewalls 14–20 may contain one or more electrical lights (not shown) to light the reservoir.

In the preferred embodiment, coping 24 acts as a substrate for mounting one or more elements, including a top loading filter assembly 44, such as one-half of the system disclosed in U.S. Pat. No. 5,236,581 incorporated herein by reference, and having a top 46 secured to the coping 24 and a filter canister (not shown) appropriately coupled to a plumbing harness 48. Coping 24 also preferably houses a switch assembly 50 for controlling the pump as well as the water temperature. Located in an opposite corner may be one or more air switches 52 for controlling the amount of air intermixed with the water passed through jets 40.

Figure 3:
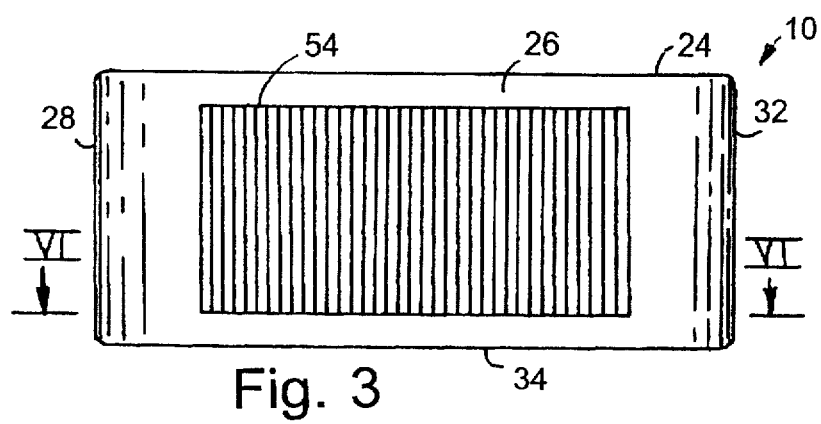
FIG. 3 is a side view of the invention illustrating the access panel.
Figure 4:
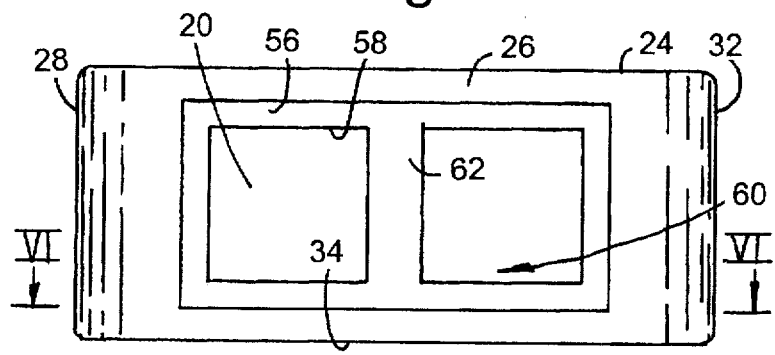
FIG. 4 is a side view of the invention with the access panel removed.

In the preferred embodiment, each of sidewalls 26, 28, 30, and 32 includes a generally centrally located access panel 54 (FIG. 3) partially received by and fixed in a depression 56 of substantially identical shape as panel 54. In a preferred embodiment, the depth of depression 56 is such that panel 54 is flush with the exterior sidewalls 26–32. It is also preferred that each depression 56 contain at least one, and preferably two axis openings generally designated as 58 to permit access to an interior space 60 defined between the exterior sides of reservoir sidewalls 14–20, the interior surfaces of exterior sidewalls 26–32, the bottom of seating 36, 38, as well as the underside of footwell 22. In order to provide structural support across access opening 58, it is preferred that a webbing 62 be provided which interconnects the upper and lower edges of recess 56.

As briefly mentioned above, disposed in interior space 60 and attached to spa jets 40 is plumbing harness 48. Plumbing harness 48 includes several tubular conduits 64 interconnected by the jet housings 66 mounted to the reservoir sidewalls 14–20. Each jet housing 66 is configured to retain at least one jet nozzle (not shown) well known in the trade. Collectively, conduits 64 are connected to the discharge side of a pump (not shown). The inlet side of the pump is interconnected through a suction inlet, such as 42, by a length of similar conduit 64.

Figure 6:
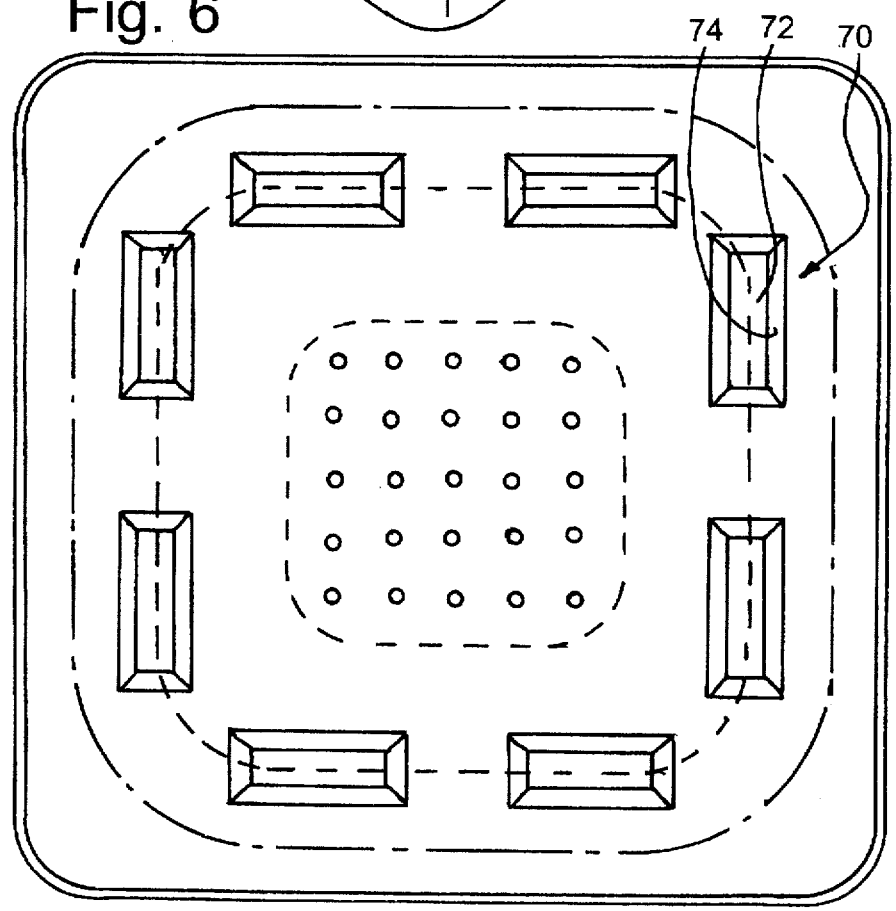
FIG. 6 is a fragmentary horizontal section view of the invention taken along line VI—VI in FIG. 3.
Figure 2:
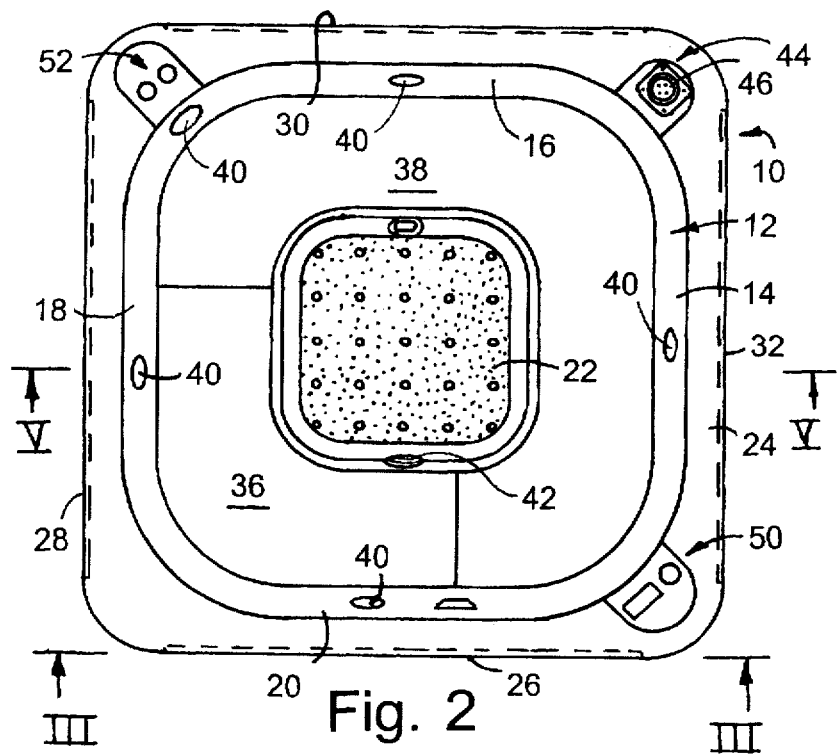
FIG. 2 is a top plan view of the invention shown in FIG. 1.
Figure 5:
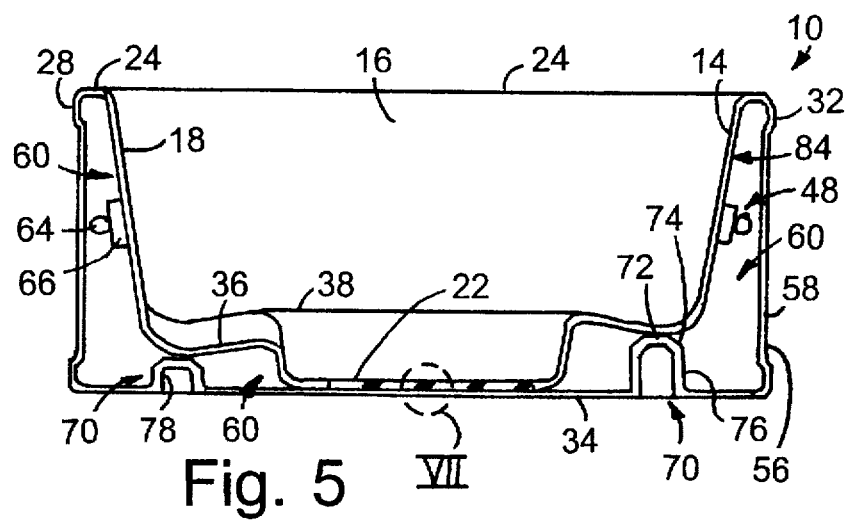
FIG. 5 is a vertical section view of the invention taken along line V—V in FIG. 2.
Figure 7:
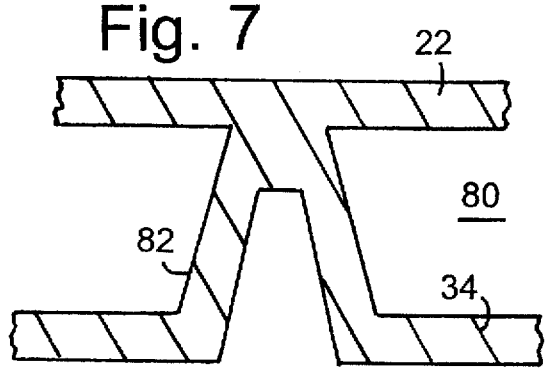
FIG. 7 is a side view of a bridge used to connect a spa footwell to the spa floor.

Referring to FIGS. 5–7, floor 34 of the spa 10 includes a plurality of standoffs, bridges, kiss-offs, and the like 70 configured to support seating surfaces 36, 38 and footwell 22 above floor 34, as well as to add structural rigidity to spa 10. Seating surfaces 36, 38 may have a variety of layouts and may include one or more benches, lounges, or recliners each adapted to comfortably position a bather within the reservoir. In the seating configuration as shown, stand-offs 70 are disposed generally equidistantly about floor 34 at locations wherein seating surfaces 36, 38 extend from reservoir sidewalls 14–20. In the preferred embodiment, each standoff 70 has a generally rectangular shape when viewed from above, and includes an upper surface 72 (FIG. 6) interconnected by a plurality of faceted surfaces 74 to vertical walls 76 extending from the surface of floor 34. Walls 76, in turn, define an interior cavity or opening 78 which is closed at one end by surfaces 72, 74 and open on the exterior surface of floor 34. The height of standoffs 70 will vary depending directly upon the distance between floor 34 and the underside of benches 36, 38. In a preferred embodiment, standoffs 70 are formed so as to be spaced approximately 0.25 inch from the bottom of seating surfaces 36, 38 plus or minus 0.125 inch, in order to permit full development or formation of the structures during the molding process as described below. Although as shown in FIG. 6 as independent and free standing ribs or standoffs, it is contemplated that a continuous-type structure may be formed in bottom 34 in order to support seating surfaces 36, 38.

With respect to the bottom of footwell 22, it too may be supported above floor 34 in a fashion similar to that of seating surfaces 36, 38. In particular, a plurality of bridges (such as shown in FIG. 7) interconnect footwell 22 with floor 34 so as to create a space 80 therebetween. In a preferred embodiment, each bridge 82 is generally conical with the broad base of the cone against floor 34 and the tapered tip of the cone connected to footwell 22. The conical bridges 82 separate footwell 22 from floor 34 to create the air gaps 80 to improve insulation as well as to support footwell 22 in a substantially rigid fashion.

Substantially encapsulating plumbing harness 48, as well as the exterior of reservoir sidewalls 14–20, the sides of footwell 22, the undersides of benches or seats 36, 38, as well as the interior radius of coping 24, is a layer of expanded polyurethane foam 84. Foam 84 may be sprayed in interior space 60 through access openings 58. With the polyurethane foam substantially expanded and hardened, the foam adds additional structural rigidity to the sides of reservoir sidewalls 14–20. Exterior of polyurethane foam 84 and filling the remainder of interior space 60 may be a conventional fiberglass batting, such as available from Owens Corning.

As briefly mentioned above, it is preferred that spa shell 10 be molded as a single component from a polymeric material. More specifically, it is preferred that spa shell 10 be molded using a rotational molding process. Due to the rectangular shape of the spa shell construction, it is contemplated that the mold for manufacturing spa shell 10 include a base of appropriate form, shape, and dimension to define coping 24, reservoir sidewalls 14–20, and footwell 22. The mold base will have clamped thereto four molded sidewalls in order to form exterior sidewalls 26–32. The sidewall molds will, in turn, then be interconnected by the floor wall of the mold, which will include structures to define standoffs 70 as well as bridges 82, described above. Although the components of this mold are particular to this specific design, the concept and principles involved in rotational molding are well known and will not be described in great detail herein. As is also well known, recesses or access openings 58 defined in exterior sidewalls 26–32 may be formed or defined by a release agent or insulative structure attached to the interior of the sidewall molds, such that the polymeric material does not adhere to that surface. The same technique can be used to define other openings in spa shell 10. These surfaces are designed to form a structural element of spa 10, such as a sidewall or the like, and are preferably made from a material capable of transmitting heat rapidly, such as aluminum.

In a preferred embodiment, spa shell 10 is preferably molded from a polyethylene powder commonly used in rotational molding applications. To produce the spa of the shape generally shown in the drawing figures, and having an exterior sidewall dimension of approximately 6 feet, 250 pounds of 35-mesh polyethylene powder, available from Quantum under the brand name MICROTHENE™ FINELY DIVIDED POLYETHYLENE POWDER, is inserted in the rotational mold. In a conventional manner, the mold is then rotated while at the same time heated to a temperature within the range of 400° to 700° F., preferably 550° to 650° F., and most preferably about 625° F. As the temperature rises within the mold, and specifically as the temperature approaches 375° F., the polyethylene powder begins to melt and coat the interior of the mold. It is well known in the art of rotational moldings that certain portions of the structure may be built up or have thicker sidewalls than other portions, based upon the particular rotation or pattern during the molding process. In this particular case, the mold is rotated in a fashion such that exterior sidewalls 26–32, coping 24, and reservoir sidewalls 14–20 are of increased thickness to support the weight of the water column contained within reservoir 12. Additionally, the mold is rotated such that standoffs 70 and bridges 82 are of sufficient thickness to support footwell 22 and seats 36, 28, and to prevent them from collapsing under the weight of the water.

With the mold temperature at approximately 625° F., rotation of the mold is continued for approximately 25 to 40 minutes, and preferably for about 30 minutes to ensure even distribution of the polyethylene within the mold cavity. The heat is then extracted and the mold is continued to be rotated for an additional 40 minutes. At the end of the rotation process, the bottom of the mold is removed and cool air is blown under the base for an additional time, preferably 5 minutes, before the remainder of the mold is disassembled. At the end of this time period, the temperature of the spa shell has been reduced to approximately 150° to 170° F. The molded spa is removed from the mold and immediately placed in a cooling fixture, which includes clamps configured to engage each access opening 58 and draw each opening outward toward the walls of the cooling fixture. This is done to prevent exterior sidewalls 26–32 from becoming concave during the final cooling process. As is well known, polyethylene has a tendency to contract at radiused corners, causing warping of the interconnecting walls. By placing the spa shell in the cooling fixture, the contraction process is reduced and a memory is created in the polyethylene to ensure that exterior sidewalls 26–32 are substantially planar, straight, and vertical. Once completely cooled, the spa shell is moved on down the assembly line wherein holes are drilled for mounting jet housing 66 and plumbing harness 48 through access openings 58. With spa harness 48 and jet housing 66 in place, the placement of the pump, filter, air switches, and switch assembly are completed. Subsequently, an expanded polyurethane foam is sprayed into interior space 60 covering the exterior of reservoir sidewalls 14–20, footwell 22, benches 36, 38, the interior surface of coping 24, and a portion of floor 34 below benches or seats 36, 38. The foam also seals off space 80 from space 60 below footwell 22. The remainder of the space within interior space 60 is then filled with the fiberglass batting. Access openings 58 are then closed by access panels 54, and the spa is ready for packaging and shipment.

If the polyethylene plastic described above is the only material used in the formation of the spa shell, the spa shell will be generally translucent. It is preferred that spa shell 10 be colored and have a look, feel, and texture approximating that of ceramics, marble, or any other rich-looking, naturally occurring substances. Polyethylene is amenable to colorants to vary the appearance and texture as desired. However, in a preferred embodiment, colorant is added, such as a white colorant available from Allied Color and designated 5080 4C. For a 250-pound amount of polyethylene, it is preferred that approximately ½ to 1 pound of colorant be added, and most preferably 0.625 pound of colorant to produce an opaque plastic shell. Additional materials or colorants may be added to highlight the sap. Such include gold or black fleck available from Peacock Colors, Incorporated, and sold under the designation AD-MICA™ and M-CHARCOAL SPARKLES™. The AD-MICA™ brand is formed from a 40-S dry-ground suzorite mica, while the black fleck is made from a 0.015- to 0.00045-mesh black epoxy. The amount of fleck necessary to achieve the desired appearance is approximately 0.005 to approximately 0.025 pound of gold fleck, most preferably 0.015 pound; and between 0.250 and 0.0625 pound of black fleck, and most preferably 0.125 pound. It has also been found that in order to assure even distribution and dissemination of the fleck within the colorant, it has been necessary to add approximately 0.015 to 0.045 pound of an anti-static material available from Plastic Color Chip of Ohio, Inc., sold under the trade name CHEMSTAT™. Most preferably, approximately 0.035 pound of the anti-static material has been found suitable. All of these components are combined with the 250 pounds of polyethylene powder prior to heating and rotational molding of the spa shell. The finished product is a generally white spa shell having finely interspersed gold and black flecks appearing like a fine white marble or granite. Other colorants and highlights may be used to achieve other textures and appearances.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A method for manufacturing a one-piece, rotationally molded spa having integral reservoir, coping, exterior sidewalls and a floor beneath the reservoir and interconnecting the exterior sidewalls, comprising the steps of:

providing a mold having a cavity defining a reservoir of a spa including a plurality of walls and a footwell, a coping, exterior walls, and a floor beneath the footwell, and all interconnected to each other;

introducing a powdered polymeric material into the mold cavity;

rotationally molding the powdered polymeric material to the shape of the spa defined by the mold cavity;

removing the rotationally molded spa from the mold; and placing the rotationally molded spa in a cooling fixture to produce a memory in the polymeric material.

2. The method as defined in claim 1, wherein the step of rotationally molding includes:

heating the mold to a temperature within a range of 3750° and 700° F.;

rotating the mold during the heating step to disperse and melt the powdered polymeric material within the mold cavity such that the molten polymeric material coats the mold cavity; and cooling the mold to a temperature between 100° and 200° F. to solidify the polymeric material within the mold cavity.

* * * * *

UNITED STATES PATENT AND TRADEMARK OFFICE
CERTIFICATE OF CORRECTION

PATENT NO. : 5,741,453
DATED : April 21, 1998
INVENTOR(S) : John C. Kennedy

It is certified that error appears in the above-indentified patent and that said Letters Patent is hereby corrected as shown below:

Column 7, claim 2, line 3;

"3750°" should be --375°--.

Signed and Sealed this

Second Day of November, 1999

Attest:

Q. TODD DICKINSON

*Attesting Officer*  Acting Commissioner of Patents and Trademarks